United States Patent [19]

Head et al.

[11] 4,087,307
[45] May 2, 1978

[54] INFLATABLE BLADDER FOR A TIRE BUILDING DRUM

[75] Inventors: William J. Head, Rollingen; Richard Carl von der Heyde, Warken, both of Luxembourg

[73] Assignee: The Goodyear Tire & Rubber Company, Akron, Ohio

[21] Appl. No.: 719,046

[22] Filed: Aug. 30, 1976

[51] Int. Cl.² .................................................. B29H 17/24
[52] U.S. Cl. .................................. 156/401; 92/92; 156/132
[58] Field of Search ............. 156/110 R, 123 R, 126, 156/128 RI, 131, 132, 133, 394, 400, 401, 414–420; 92/92

[56] References Cited

U.S. PATENT DOCUMENTS

| | | | |
|---|---|---|---|
| 2,708,994 | 5/1955 | Kraft | 92/92 |
| 2,715,933 | 8/1955 | Frazier | 156/415 |
| 2,943,668 | 7/1960 | Trevaskis et al. | 156/401 |
| 3,173,821 | 3/1965 | Trevaskis | 156/401 |
| 3,479,238 | 11/1969 | Kehoe et al. | 156/401 |
| 3,503,829 | 3/1970 | Menell et al. | 156/401 |
| 3,718,520 | 2/1973 | Leblond | 156/400 |
| 3,853,653 | 12/1974 | Olbert et al. | 156/401 |
| 3,883,387 | 5/1975 | Csatlos | 156/132 |
| 3,910,163 | 10/1975 | Elliott | 92/92 |

*Primary Examiner*—William A. Powell
*Assistant Examiner*—John E. Kittle
*Attorney, Agent, or Firm*—R. S. Washburn

[57] ABSTRACT

An inflatable bladder for a tire building drum is adapted for mounting snugly on a cylindrical drum extension which has a circumferential groove accommodating a non-inflatable elastic ring secured integrally to the bladder. The bladder inner wall has a flangeless port between two circumferential sealing ribs integral with the bladder wall. The port is in air-flow communication with a channel in the outer surface of the extension.

3 Claims, 1 Drawing Figure

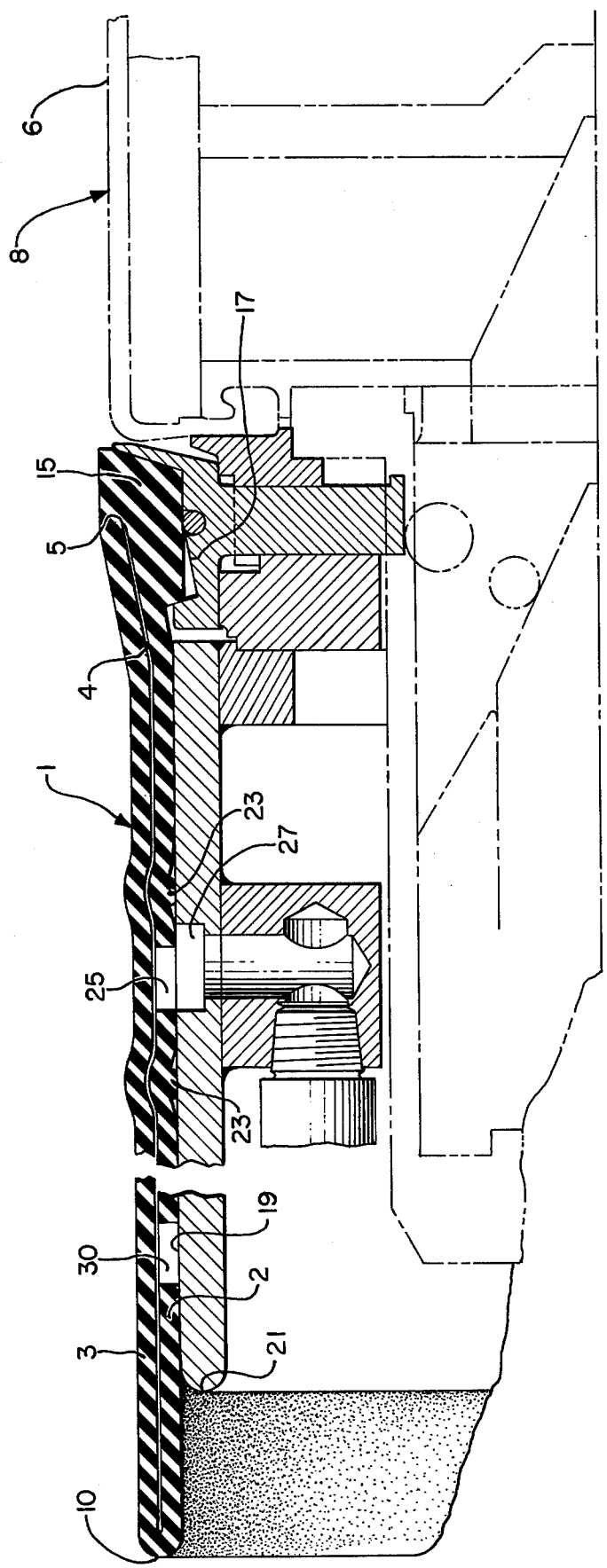

INFLATABLE BLADDER FOR A TIRE BUILDING DRUM

The foregoing abstract is not to be taken as limiting the invention of this application, and in order to understand the full nature and extent of the technical disclosure of this application, reference must be made to the accompanying drawing and the following detailed description.

The present invention relates to a bladder for use in a tire building drum, particularly for turning or folding an edge of a ply disposed about the drum. Still more particularly, the invention relates to means for communicating inflating air between the bladder and the drum on which it is mounted.

Heretofore, a bladder for a tire building machine has required a mechanical connection including a nipple molded or attached integrally with the bladder and which nipple extended radially inward through a hole or slot in the drum surface. The nipple was there connected, by a threaded or like mechanical coupling, to air conduit means contained in the drum.

The arrangements of the prior art have two disadvantages. The time and effort required to mount a bladder having a nipple, during which time the tire building drum was unavailable for productive use, was costly. During stitching of a tire carcass on the drum, the bladder tended to move circumferentially relative to the drum, resulting too frequently in damage to the air connection nipple or to the related parts, which resulted in need prematurely to replace the bladder on the drum.

A primary object of the invention is to reduce or overcome the disadvantages mentioned and is accomplished according to the invention by the provision of an inflatable bladder for tire building drum having a circumferential bladder seating groove and a circumferentially extending air-flow channel, comprising an annular inflatable tube having in its uninflated condition an inner edge for disposition adjacent said groove, an outer edge for disposition at an axial distance from the groove, and a generally cylindrical wall extending between said inner and said outer edge, a non-inflatable ring secured integrally to said inner edge and adapted to seat conjugately in said groove, a pair of sealing ribs integral with said wall for sealingly engaging said drum circumferentially adjacent said channel, and a flangeless port in said wall between said ribs connecting said inflatable tube and said channel for air-flow therebetween.

To acquaint persons skilled in the related arts with the principles and advantages of the invention, there is described hereinbelow with reference to the attached drawings a preferred embodiment illustrating the best mode now contemplated for the practice of the invention.

In the drawings:

The FIGURE is a schematic section view of a bladder embodying the invention disposed on a representative portion of a tire building drum.

The bladder 1 in the figure comprises a cylindrical inner wall 2 and a cylindrical outer wall 3 which together form an annular tube enclosing an inflatable chamber 4. The inner and outer wall join to form an inner edge 5 of the bladder, the term inner having reference to that edge of the bladder disposed nearer central part 6 of the building drum 8. An outer edge 10 is formed by the juncture of the inner 2 and outer 3 walls at a distance axially from the part 6. The bladder walls have reinforcing cord plies therein extending about the respective edges. However, the bladder may be formed completely of elastomer without reinforcing cord plies without departing from the principles of the present invention.

A non-inflatable elastomeric ring 15 is molded and cured integrally with and about the inner edge 5 and has a form or profile adapted to seat conjugately in the circumferential groove 17 of the building drum. The ring 15 and the inner wall 3 of the bladder are dimensioned so as to be stressed in tension when placed on the drum. The tension produced in the bladder on the drum maintains the elastomeric ring 15 in the groove 17 and holds the inner wall 2 snugly in engagement with the cylindrical surface 19 extending betwee the associated axial end 21 of the drum and its central part 6.

When inflated, the bladder 1 can roll or be rolled axially toward the mid-plane of the drum, over the inner edge 5, to turn or fold a ply disposed therearound, as about a tire bead ring in the known manner.

The inner wall lies around and along the cylindrical surface 19 of the drum axially outward from the groove.

Two circumferentially extending sealing ribs 23 are molded and cured integrally on the inner wall 2 to project radially inwardly for sealing engagement with the cylindrical surface 19. This engagement is augmented by the circumferential tension in the bladder.

In accordance with the invention, a flangeless port 25 is formed in the inner wall 2 between the two sealing ribs 23. The port may be molded during curing of the bladder or can be formed therein subsequent to the curing.

To provide inflation air to the chamber 4 of the annular tube, a channel 27 is formed in the surface 19 of the drum at a predetermined distance from the circumferential groove 17 equal to the distance between the ring 15 of the bladder and the port 25. The sealing ribs 23, in the uninflated state of the bladder are in sealing engagement with the cylindrical surface of the drum closely adjacent the channel on each side thereof. The axial distance between the sealing ribs is limited to that necessary to straddle the channel in the drum surface so that the pressure of air applied therein to inflate the bladder and which pressure acts on the bladder wall 2 between the ribs 23 cannot exert sufficient force to expand the bladder prematurely and bleed or exhaust the air. The channel 27 and the corresponding sealing ribs 23 are located in a portion of the wall 2 which remains in contact with the surface 19 of the drum during normal inflation and rolling of the bladder.

In accordance with a further aspect of the invention, the distance axially of the bladder between the elastomeric ring 15 and the sealing ribs 23 is such that if the bladder rolls or is caused to roll too far or if the bladder is over-inflated, the bladder will in that event uncover the channel 27 by lifting the sealing rib from the surface of the drum extension to allow the exhaust of air pressure. It is also comtemplated that the sealing rib can be so located with respect to the channel that the exhaust of air from the bladder is initiated when the bladder has rolled or been rolled to the distance required to complete the turnup of the ply endings. Alternatively, a second flangeless port 30 can be provided, so located axially of the bladder from the elastomeric ring as to be opened to relieve pressure in the bladder if excessive or if the bladder has rolled too far. These arrangements have the advantage of reducing the time required to exhaust air through the air inflow passages and the associated control valve, thereby improving the productive capacity of the building drum, as well as protecting the bladder from over pressure.

The bladder in accordance with the invention, having no mechanical connection extending through the surface of the building drum, can move circumferentially in response to stitching of succeeding carcasses on the drum without damage to the bladder. Moreover, the bladder is more quickly and easily mounted on and dismounted from the drum expecially at the inboard side of the drum. The bladder in accordance with the invention is protected against excessive air pressures therewithin as well as against excessive axial movement since in either event the inflation air is spilled or exhausted without harm for the bladder.

While certain representative embodiments and details have been shown for the purpose of illustrating the invention, it will be apparent to those skilled in the art that various changes and modifications may be made therein without departing from the spirit or scope of the invention.

What is claimed is:

1. A turnup bladder and a tire building drum, the drum having a circumferential bladder seating groove open radially outwardly thereof and a circumferentially extending outwardly open U-shaped channel for air spaced axially from said groove, said bladder being secured to said drum only by its own elastic tension, said bladder comprising an annular inflatable tube having in its uninflated condition an inner edge disposed proximate said groove, an outer edge disposed at an axial distance from the groove and a generally cylindrical wall extending between said inner and said outer edge and snugly engaging said drum, an elastic ring secured integrally to said inner edge and adapted to seat snugly conjugately in said groove, a pair of circumferentially extending ribs integral with said wall snugly engaging said drum circumferentially respectively adjacent and axially outward of said channel, and a flangeless port in said wall between said ribs providing open communication between said bladder and said channel for air flow therebetween independent of the relative angular relation of said bladder and said drum.

2. An inflatable turnup bladder and a tire building drum having an axially central part and an axially outwardly extending cylindrical bladder support surface, the bladder comprising an inner wall constructed and arranged for snug engagement with said cylindrical surface being secured thereto only by elastic tension, an outer wall cooperating with said inner wall to define an inflatable chamber and joined to said inner wall to define respectively an inner edge adjacent to said central part and an outer edge remote from said part, said bladder being axially rollable toward said inner edge when said chamber is inflated, said drum being provided with a U-shaped air channel opening outwardly of said surface and extending in a circumferential direction therearound, said channel being located axially of the drum between said inner and said outer edge when the bladder is placed around the drum, said inner wall having a flangeless port open therethrough at a fixed axial distance from said inner edge at a distance equal to the axial distance between said channel and said inner edge, said port providing passage for air between said channel and said chamber.

3. An inflatable bladder for a tire building drum having a central part and a cylindrical bladder support surface, comprising an inner wall constructed and arranged for snug engagement with said cylindrical surface, an outer wall cooperating with said inner wall to define an inflatable chamber and joined to said inner wall to define respectively an inner edge adjacent to said central part and an outer edge remote from said part, said drum being provided with an air channel opening to said surface and extending in a circumferential direction therearound, said channel being located axially of the drum between said inner and said outer edge when the bladder is placed therearound, and including a flangeless port open through said inner wall to pass air between the channel and the chamber, and a second flangeless port opening through said inner wall and normally closed to air flow therethrough by said surface and so located between said inner and said outer edge axially of the bladder so as to be opened to exhaust air from the chamber in response to axial movement of the bladder beyond a predetermined axial displacement while being inflated.

* * * * *